United States Patent
Varanasi et al.

(12)

(10) Patent No.: US 10,140,181 B1
(45) Date of Patent: Nov. 27, 2018

(54) ENDURANCE AWARE RAID SCHEME FOR FLASH BASED SSDS WITH FPGA OPTIMIZED IMPLEMENTATION

(71) Applicant: Vexata, Inc., Santa Clara, CA (US)

(72) Inventors: Surya P. Varanasi, Dublin, CA (US); Shailendra Jha, Folsom, CA (US)

(73) Assignee: Vexata, Inc., Santa Clara, CA (US)

( * ) Notice: Subject to any disclaimer, the term of this patent is extended or adjusted under 35 U.S.C. 154(b) by 24 days.

(21) Appl. No.: 15/159,654

(22) Filed: May 19, 2016

(51) Int. Cl.
*G06F 11/10* (2006.01)
*G06F 3/06* (2006.01)

(52) U.S. Cl.
CPC ........ *G06F 11/1092* (2013.01); *G06F 3/0616* (2013.01); *G06F 3/0689* (2013.01)

(58) Field of Classification Search
CPC ... G06F 3/0616; G06F 3/0689; G06F 11/1092
See application file for complete search history.

(56) References Cited

U.S. PATENT DOCUMENTS

| | | | |
|---|---|---|---|
| 5,996,031 A | 11/1999 | Lim et al. | |
| 7,865,761 B1 * | 1/2011 | Chilton | G06F 12/023 711/103 |
| 8,661,187 B2 * | 2/2014 | Hetzler | G06F 12/0246 711/103 |
| 8,683,296 B2 * | 3/2014 | Anderson | H03M 13/6502 714/6.24 |
| 8,825,938 B1 * | 9/2014 | Ellard | G06F 12/0246 711/103 |
| 9,032,165 B1 | 5/2015 | Brooker | |
| 9,722,632 B2 * | 8/2017 | Anderson | H03M 13/1515 |
| 2003/0061459 A1 | 3/2003 | Aboulenein et al. | |
| 2006/0143336 A1 | 6/2006 | Stroobach et al. | |
| 2010/0287333 A1 | 11/2010 | Lee et al. | |
| 2012/0324178 A1 | 12/2012 | Yoon et al. | |
| 2013/0191601 A1 | 7/2013 | Peterson et al. | |
| 2016/0246518 A1 * | 8/2016 | Galbraith | G06F 3/0619 |
| 2017/0228158 A1 * | 8/2017 | Kraemer | G06F 3/0605 |
| 2017/0285972 A1 * | 10/2017 | Dalmatov | G06F 3/0616 |

* cited by examiner

*Primary Examiner* — Joseph R Kudirka
(74) *Attorney, Agent, or Firm* — Pillsbury Winthrop Shaw Pittman LLP

(57) ABSTRACT

Described is a redundant array of inexpensive disks (RAID) scheme that manages the wear of individual drives in a RAID set and significantly reduces the probability of more than two drives wearing out at the same time. In one aspect, describe is a method in which at least one of a first and second of the plurality of at least three low endurance flash based solid state devices perform a predetermined percentage of more writes as compared to at least a third of the plurality of at least three low endurance flash based solid state devices. In another aspect, a rebuild operation is performed using Galois Field Multiplication, with one of an integrated circuit and a field programmable gate array (FPGA) being used in preferred implementations.

16 Claims, 4 Drawing Sheets

ENDURANCE AWARE RAID SCHEME FOR FLASH BASED SSDS WITH FPGA OPTIMIZED IMPLEMENTATION

BACKGROUND

In a standard RAID-5 or RAID-6 implementation, typically equal amount of writes are performed on each drive in the RAID set over time. For RAID implementations based on SSD drives using low endurance flash e.g. TLC, this can become a serviceability & availability issue since all the drives in the RAID set could wear out almost around the same time. Even with RAID-6 implementation, only a maximum of two drive failures can be handled at a given time.

A typical RAID-6 implementation with N drives spreads N-2 write data blocks into N-2 drives and then writes two blocks of parity (called P & Q) into the remaining 2 drives. This process of spreading write data into multiple drives is called RAID striping, and each set of N-2 write data blocks along with its parity blocks is called a RAID stripe. The example below shows how RAID-6 stripes are arranged in a typical 4-drive RAID set.

| Drive 0 | Drive 1 | Drive 2 | Drive 3 | |
|---|---|---|---|---|
| WB0 | WB1 | P0 | Q0 | → stripe# 0 |
| Q1 | WB2 | WB3 | P1 | → stripe# 1 |
| P2 | Q2 | WB4 | WB5 | → stripe# 2 |
| WB6 | P3 | Q3 | WB7 | → stripe# 3 |

WBn are the write blocks. Pn and Qn are the parity blocks for stripe# N. Parity blocks are rotated with each new stripe so that all 4 drives store write data blocks (not just parity) which in turn increases the available read bandwidth. Striping pattern for stripe#4 matches stripe#0, stripe#5 matches stripe#1 and so on.

In the above standard RAID-6 striping scheme each drive performs an equal amount of writes over time. Thus, all 4 drives will wear equally over time in such a system where all of the drives are the same, as is conventional.

SUMMARY

Described is a RAID scheme that manages the wear of individual drives in a RAID set and significantly reduces the probability of more than two drives wearing out at the same time.

In one aspect, described is a method of operating a Raid system comprising the steps of providing a RAID system that includes a plurality of at least three low endurance flash based solid state drives; and implementing a data striping during write operations in which at least a one of a first and second of the plurality of at least three low endurance flash based solid state devices perform a predetermined percentage of more writes as compared to at least a third of the plurality of at least three low endurance flash based solid state devices, thereby causing the third of the plurality of at least three low endurance flash based solid state devices to wear out after the first and second of the plurality of at least three low endurance flash based solid state devices.

In another aspect, a rebuild operation is performed using Galois Field Multiplication, with one of an integrated circuit and an FPGA being used in preferred implementations.

BRIEF DESCRIPTION OF PREFERRED EMBODIMENTS

These and other aspects and features will become apparent to those of ordinary skill in the art upon review of the following description of specific embodiments of the invention in conjunction with the accompanying figures, wherein FIG. 1 illustrates an overview of a raid scheme according to a preferred embodiment.

DETAILED DESCRIPTION OF THE PREFERRED EMBODIMENTS

Figure 1:
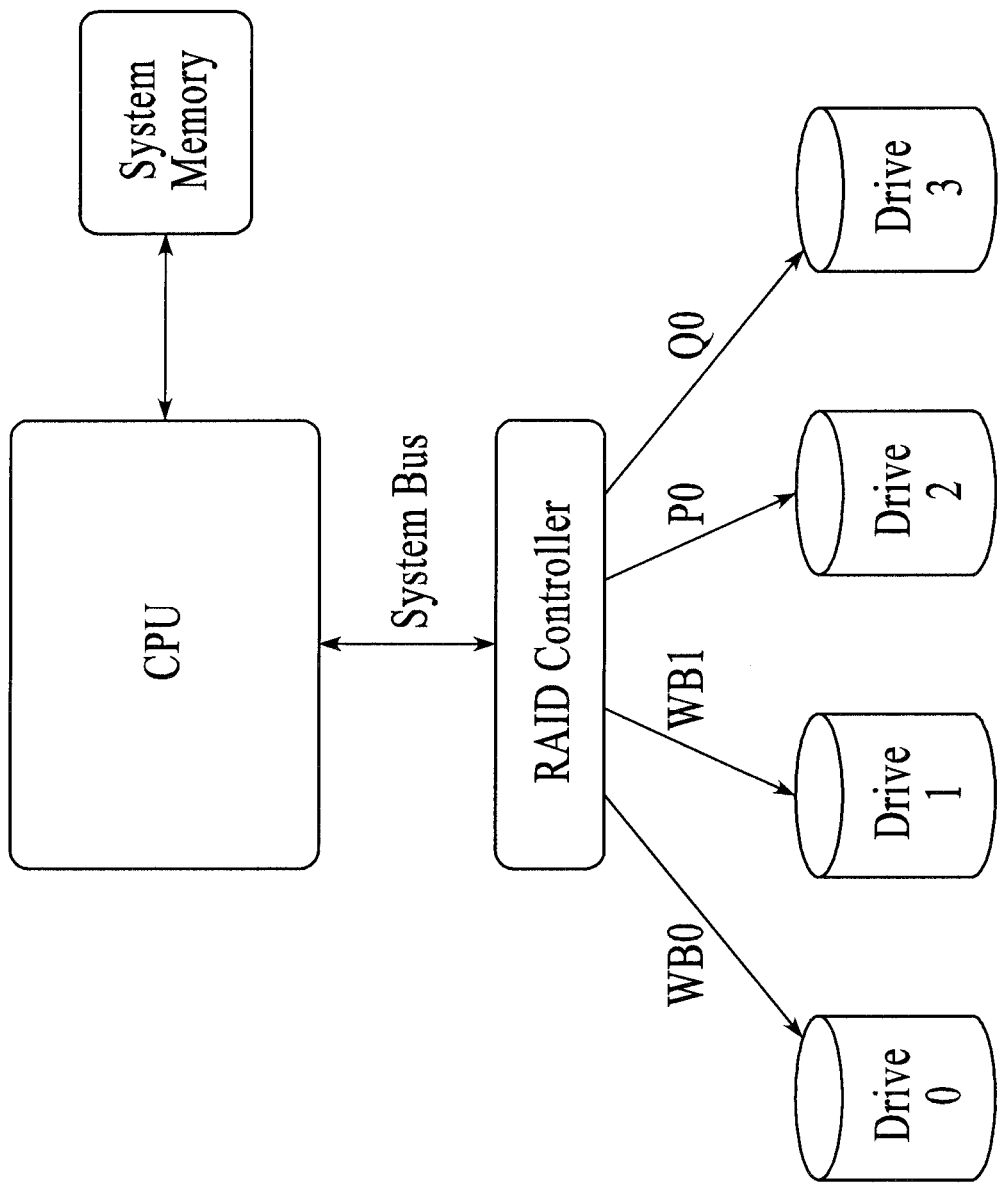

The described endurance aware RAID striping scheme significantly improves Serviceability & Availability of storage systems which use low endurance flash based SSDs. Also, the pipelined implementation architecture proposed enables high performance FPGA implementation. An illustration of an overview of a raid scheme according to a preferred embodiment is shown in FIG. 1, with the Raid Controller receiving the data from the CPU and performing the read and write operations on the data into and from, respectively, the various. Drives 0-3 as illustrated.

Data striping is a technique of segmenting logically sequential data, such as a file, so that consecutive segments are stored on different physical storage devices. Striping allows a processing device to request data more quickly by getting portions of the data from different ones of the different physical storage devices instead of from a single storage device, thus obtaining it more quickly than the single storage device can provide it. By spreading segments across multiple devices which can be accessed concurrently, total data throughput is increased. Data striping is also useful in other ways, such as balancing I/O load across an array of disks.

The described endurance aware striping scheme looks as follows—

| Drive 0 | Drive 1 | Drive 2 | Drive 3 | |
|---|---|---|---|---|
| WB0 | SK0 | P0 | Q0 | → stripe# 0 |
| Q1 | WB1 | WB2 | P1 | → stripe# 1 |
| P2 | Q2 | WB3 | WB4 | → stripe# 2 |
| SK3 | P3 | Q3 | WB5 | → stripe# 3 |

As conventional, WBn are the write blocks. Pn and Qn are the parity blocks for stripe#N. Parity blocks are rotated with each new stripe so that all 4 drives store write data blocks (not just parity) which in turn increases the available read bandwidth.

SKn is called a skipped write block.

SK0 write in stripe#0 will actually "not" be performed on Drive 1. Also, P0 & Q0 is calculated assuming SK0 is an all-zero data block, Similarly, SK3 write in stripe#3 will actually "not" be performed on Drive 0. P3 & Q3 is calculated assuming SK3 is an all-zero data block.

Striping pattern for stripe#4 matches stripe#0, stripe#5 matches stripe#1 and so on.

With the described striping scheme, over time Drive 0 and Drive 1 perform 25% less writes compared to Drive 2 & 3. This implies Drive 2 & 3 will wear out faster compared to Drive 0 & 1. This will improve availability and serviceability since Drives 2 & 3 can be replaced without taking the storage offline and allows replacement of 2 drives at a time in a planned and phased manner. It is noted that depending on the scheme and the number of Drives, that the percentage of less writes that at least two of the Drives will be 100/# of drives percent, such that the predetermined percentage preferably ranges between 3-33%.

Provided below is another example based upon 6 drives. In this example, Drives 0-3 perform ~16.67% less writes compared to Drive 4 & 5.

| Drive 0 | Drive 1 | Drive2 | Drive3 | Drive4 | Drive5 |
|---------|---------|--------|--------|--------|--------|
| WB0 | WB1 | WB2 | SK0 | P0 | Q0 → stripe #0 |
| Q1 | WB3 | WB4 | WB5 | WB6 | P1 → stripe #1 |
| P2 | Q2 | WB7 | WB8 | WB9 | WB10 → stripe #2 |
| SK3 | P3 | Q3 | WB11 | WB12 | WB13 → stripe #3 |
| WB14 | SK4 | P4 | Q4 | WB15 | WB16 → stripe #4 |
| WB17 | WB18 | SK5 | P5 | Q5 | WB19 → stripe #5 |

In the event of a drive failure, data blocks can be recovered by skipping drive reads for SKn blocks and using all zeroes in place of SKn for data recovery calculations.

After new drives replace old drives, the same scheme can be maintained, as there will still be a difference in the time between when the new drives and the old drives need to be replaced.

FPGA Optimized Implementation

Typical FPGA implementations of RAID-6 has to trade-off performance because of the complexity of RAID-6 computation involved which limits pushing the clock frequency higher. The proposed implementation scheme pipelines the RAID data-path in a way which allows for pushing the performance higher.

At the crux of RAID-6 algorithm lies the Galois Field Multiplication (GFM) of all bytes of a data block with one byte coefficient. The proposed scheme breaks the GFM operation into a pipeline of two basic operations of XOR and "mutliplty-by-2" ("shift" and XOR). The following section shows how the pipelined GFM (P-GFM) is implemented.

Pipelined GFM (P-GFM)

Figure 2:
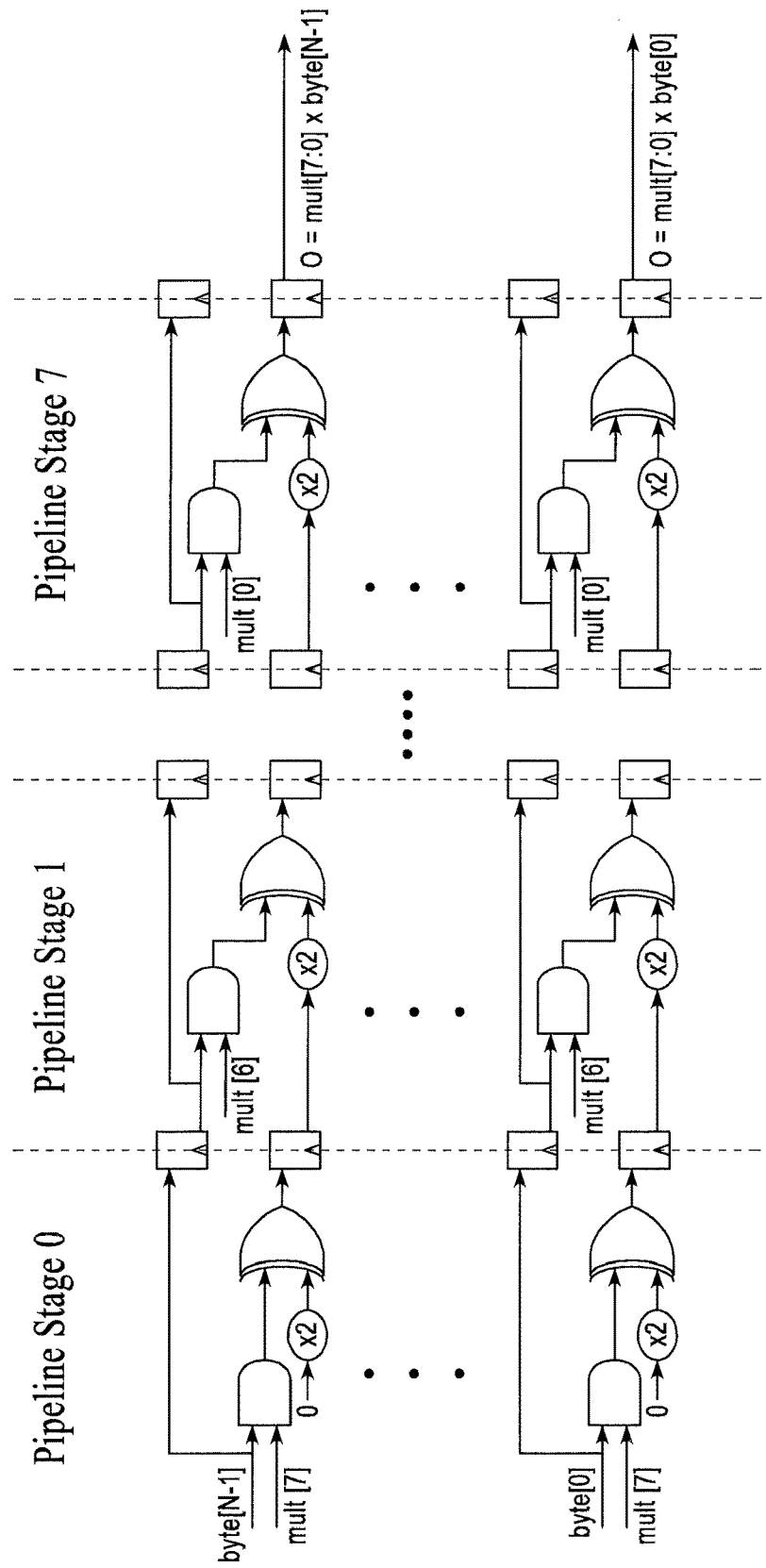
FIG. 2 illustrates a GFM multiplication scheme according to a preferred embodiment.

The 8-stage datapath pipeline shown in FIG. 2 implements GF multiplication of a N-bytes wide data-bus by a 1-byte wide multiplier—mult[7:0].

Each stage is constructed using one XOR and one "multiply-by-2" operation, minimal levels of logic in each stage of the pipe enables running this circuit at high frequencies allowing higher performance not only in integrated circuit implementations, but even in FPGA implementations.

Figure 4:
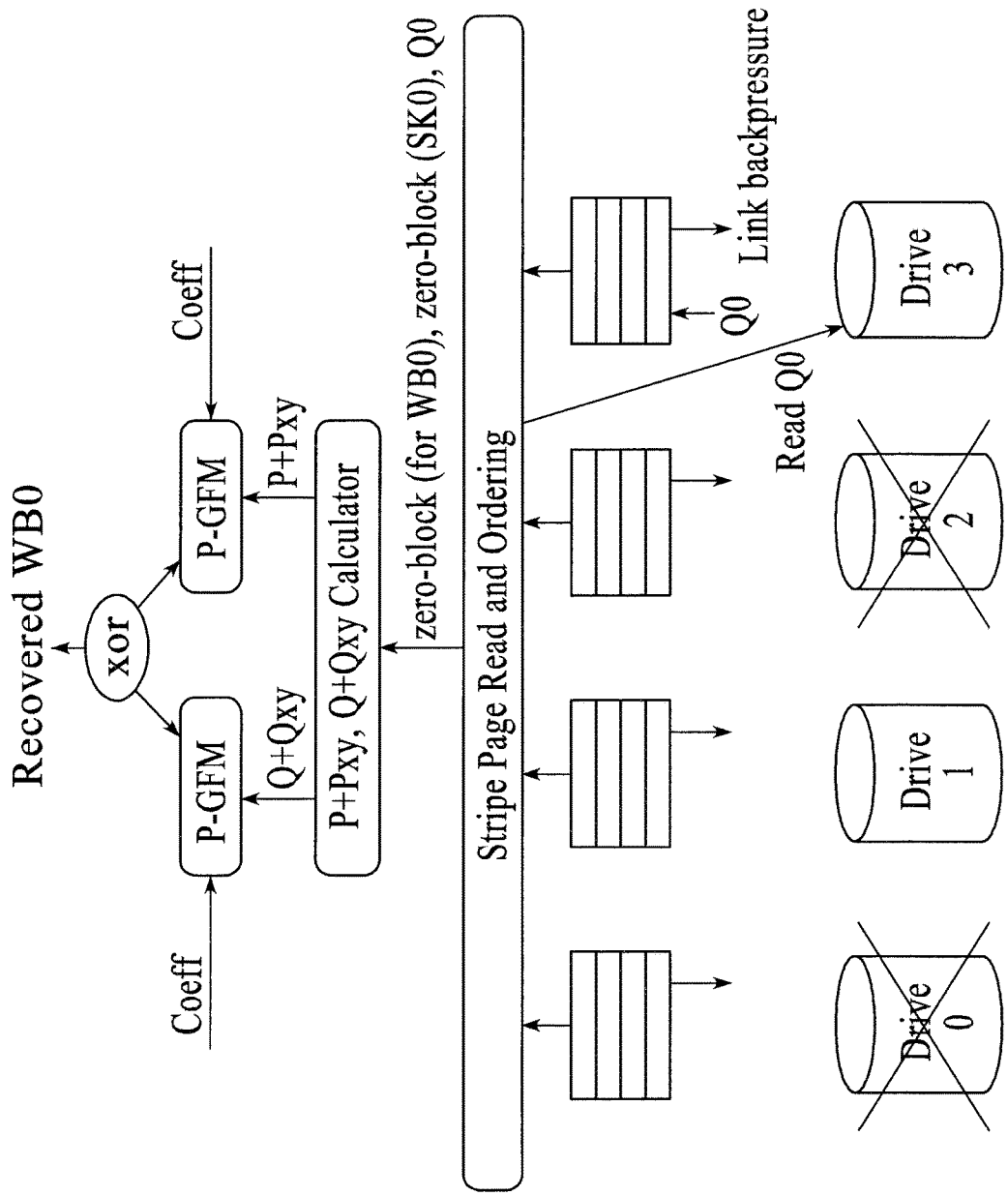
FIG. 4 illustrates a RAID rebuild datapath according to an embodiment.

Using P-GFM, XOR (shown as "+" in the diagrams below) and "multiply-by-2" as basic building blocks, the RAID rebuild functions are implemented as shown in FIG. 4.

RAID Write Datapath

Figure 3:
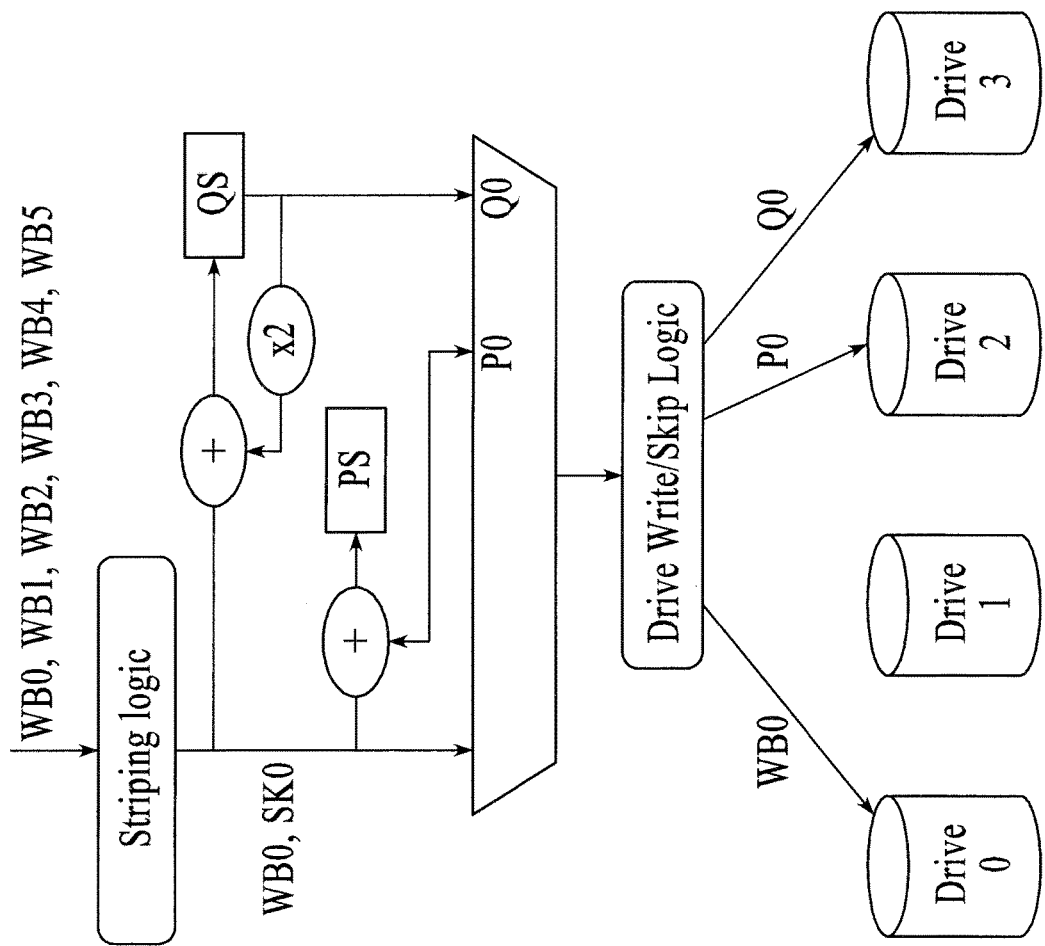
FIG. 3 illustrates a RAID write datapath according to a preferred embodiment.

As user data blocks "WBn" are received it is striped (see striping examples above) and written into the drives. The parity blocks P and Q for a stripe is calculated on the fly as shown in FIG. 3. "PS" stores the partially computed P parity for a stripe. Similarly, "QS" stores the partially computed Q parity for a stripe. After all data blocks are written, parity blocks P & Q are subsequently written into the drives before closing the stripe, as shown in FIG. 3.

RAID Rebuild Datapath

The datapath implementation below describes the rebuild pipeline which recovers data from replaced or failed drives by reading data/parity blocks from the remaining surviving drives. As such, one or two drives that have been replaced or failed can be replicated, without having to replace all the drives, one by one, which results in a long, difficult replacement process. The example herein shows how WB0 of stripe 0 is recovered after drive 0 & drive 2 are replaced or have failed.

Pxy is calculated exactly like P parity with all-zero blocks replacing the data blocks from the missing drives. Similarly, Qxy is calculated exactly like Q parity with all-zero blocks replacing the data blocks from the missing drives.

The rebuild datapath is built using just three basic compute modules i.e. XOR, multiply-by-2 & P-GFM previously described and illustrated in FIG. 2, enabling high frequency implementations, as illustrated in FIG. 4, with the coefficients being constants that are conventional as known with respect to RAID implementations.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures.

What is claimed is:

1. A method of operating a redundant array of inexpensive disks (RAID) system comprising a plurality of at least three low endurance flash based solid state devices, the method comprising:
   segmenting data to be stored on different ones of the plurality of at least three low endurance flash based solid state devices; and
   performing a plurality of write operations comprising a data striping scheme, the data striping scheme causing at least a first and second of the plurality of at least three low endurance flash based solid state devices perform a predetermined percentage of more write operations as compared to at least a third of the plurality of at least three low endurance flash based solid state devices thereby causing the at least third of the plurality of at least three low endurance flash based solid state devices to wear out after the first and second of the plurality of at least three low endurance flash based solid state devices, wherein the data striping scheme comprises one or more skipped write blocks configured to skip performing a write operation among the plurality of write operations on the third of the plurality of at least three low endurance flash based solid state devices.

2. The method according to claim 1, further including the step of replacing either of the at least first and second of the plurality of at least three low endurance flash based solid state devices prior to replacing the third of the plurality of at least three low endurance flash based solid state devices.

3. The method according to claim 2, wherein the predetermined percentage is a range of 3-33%.

4. The method according to claim 1, further including the steps of:
   substituting at least one of a new third low endurance flash based solid state devices for the third low endurance flash based solid state device; and performing a rebuild operation on the new third low endurance flash based solid state device, wherein the rebuild operation performs the rebuild operation based upon certain data stored in other ones of the plurality of RAID low endurance flash based solid state devices included within the RAID system.

5. The method according to claim 4, wherein the rebuild operation includes performing Galois Field Multiplication (GFM) of all bytes of a data block with one byte coefficient.

6. The method according to claim 5, wherein the GFM includes providing a multi-stage pipeline, each stage of the pipeline including circuitry that performs two basic operations of 1) one exclusive or (XOR) operation and 2) one multiply-by-2 operation to implement the GFM operation.

7. The method according to claim 5, wherein the multi-stage pipeline is constructed using a field programmable gate array (FPGA).

8. The method according to claim 5, wherein the multi-stage pipeline is constructed using an integrated circuit.

9. The method according to claim 1, wherein the data striping scheme further comprises one or more parity blocks configured to be rotated with each new stripe in the stripping scheme thereby causing each disk in the RAID system to contain at least one or more write blocks.

10. A method of for rebuilding at least one new redundant array of inexpensive disk (RAID) low endurance flash based solid state device of a RAID system utilizing a multi-stage pipeline configured to implement Galois Field Multiplication (GFM), the multi-stage pipeline comprising circuitry that performs 1) one exclusive OR (XOR) operation and 2) one multiply-by-2 operation, the method comprising:
    performing, at each stage of the multi-stage pipeline, one XOR operation;
    performing, at each stage of the multi-stage pipeline, one multiply-by-2 operation; and
    performing a rebuild operation, utilizing the multi-stage pipeline, on the at least one new RAID low endurance flash based solid state device, by implementing Galois Field Multiplication (GFM) of all bytes of a data block with one byte coefficient on the at least one new RAID low endurance flash based solid state device that has replaced at least one RAID low endurance flash based solid state device of a plurality of RAID low endurance flash based solid state devices included within the RAID system.

11. The method according to claim 10, wherein the rebuild operation performs the rebuild operation based upon certain data stored in other ones of the plurality of RAID low endurance flash based solid state devices included within the RAID system.

12. The method according to claim 11, wherein the multiply-by-two operation is implemented using a Shift and a XOR.

13. The method according to claim 12, wherein the multi-stage pipeline is constructed using a field programmable gate array (FPGA).

14. The method according to claim 12, wherein the multi-stage pipeline is constructed using an integrated circuit.

15. The method according to claim 10, wherein the multi-stage pipeline is constructed using a field programmable gate array (FPGA).

16. The method according to claim 10, wherein the multi-stage pipeline is constructed using an integrated circuit.

* * * * *